H. L. DOULTON, S. F. CORBY, AND R. J. PLEACE.
WATER SILENCER.
APPLICATION FILED JUNE 13, 1921.

1,406,943. Patented Feb. 14, 1922.

Inventors:
Henry L. Doulton
Sydney F. Corby
Richard J. Pleace
By their Attorneys,
Baldwin Wight

UNITED STATES PATENT OFFICE.

HENRY LEWIS DOULTON, SYDNEY FREDERICK CORBY, AND RICHARD JAMES PLEACE, OF LONDON, ENGLAND.

WATER SILENCER.

1,406,943.     Specification of Letters Patent.     Patented Feb. 14, 1922.

Application filed June 13, 1921. Serial No. 477,319.

(GRANTED UNDER THE PROVISIONS OF THE ACT OF MARCH 3, 1921, 41 STAT. L., 1313.)

*To all whom it may concern:*

Be it known that we, HENRY LEWIS DOULTON, SYDNEY FREDERICK CORBY, and RICHARD JAMES PLEACE, subjects of the King of Great Britain, all residing at Royal Doulton Potteries, Lambeth, London, S. E. I., England, have invented new and useful Improvements in Water Silencers, (for which we have filed applications in England Feb. 14, 1920, Patent No. 164,805, and Jan. 11, 1921,) of which the following is a specification.

This invention relates to the prevention of noise caused by water flowing from a pipe especially when delivered into cisterns, baths or other vessels.

According to this invention a disk or disks of gauze, preferably metallic gauze, is inserted in the pipe and the flow of water is throttled on each side of the gauze by constrictions in the pipe, the constriction on the inlet side being substantial, that is to say less than half the bore of the pipe, and preferably washers of flexible material are inserted on each side of the gauze.

Figure 1:
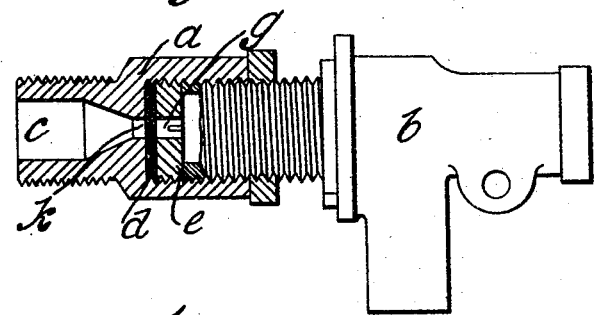
Figure 2:
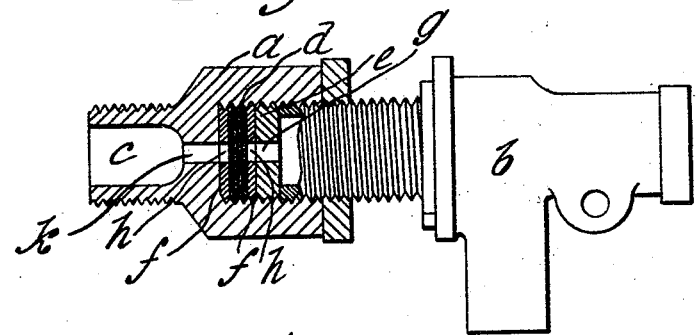

The annexed drawings show three methods of carrying out this invention. Figures 1 and 2 are sections partly in elevation and Figure 3 is a section.

In Figures 1 and 2 $a$ is a socket adapted to be screwed on to the inlet side of a ball cock or valve $b$. The internal diameter of the socket $a$ is larger than the inlet $c$. Into the socket $a$ are inserted disks of gauze $d$ which are there retained by a plug $e$. In Figure 2 washers $f\ f$ are inserted on each side of the disks. In the plug $e$ and washers $f$ are holes $g$ and $h\ h$ respectively of a size approximating that of a hole $k$ leading from the inlet $c$ to the disks $d$. The water passing from the inlet $c$ to the ball cock $b$ is throttled by the holes which are of a diameter less than half the bore of the inlet.

Figure 3:
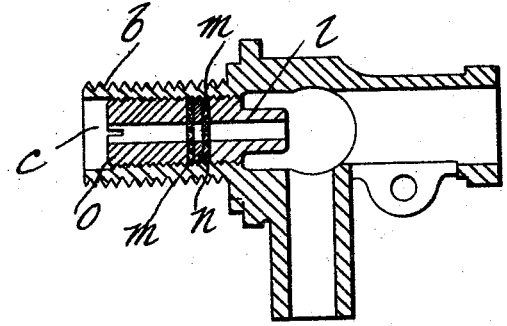

In Figure 3 a plug $l$ is screwed into the inlet of the ball cock $b$ into which are also inserted two disks of gauze $m\ m$ separated by a washer $n$ of flexible material and retained there by another plug $o$, the holes in the two plugs and the washer being as before of diameters of less than half the bore of the inlet.

What we claim is:—

1. A valved water pipe, having constrictions in its bore, and provided with means for preventing noise, comprising a disc of gauze in the pipe on the inlet side of the valve and remote from the valve and mounted between constrictions in the bore of the pipe, the bore of the pipe at the constriction on the inlet side being less than half the larger portion of the bore of the pipe.

2. A valved water pipe, having constrictions in its bore, provided with means for preventing noise, comprising a disc of gauze in the pipe on the inlet side of the valve and remote from the valve, mounted between constrictions in the bore of the pipe, the bore of the pipe at the constriction on the inlet side being less than half the larger portion of the bore of the pipe, and flexible washers on each side of the disc.

3. A valved water pipe, having constrictions in its bore, provided with means for preventing noise, comprising a disc of gauze in the pipe on the inlet side of the valve and remote from the valve, and mounted between constrictions in the bore of the pipe, the bore of the pipe at the constriction on the inlet side being less than half the larger portion of the bore of the pipe, flexible washers on each side of the disc, said disc and washers being held securely in place between the constrictions in the bore of the pipe.

4. A valved water pipe, having constrictions in its bore, provided with means for preventing noise, comprising a disc of gauze in the pipe on the inlet side of the valve and remote therefrom, said disc being mounted between permanently open constrictions in the bore of the pipe, the bore of the pipe at the constriction on the inlet side being less than half the larger portion of the bore of the pipe.

In testimony that we claim the foregoing as our invention we have signed our names the twenty-seventh day of May 1921.

HENRY LEWIS DOULTON.
SYDNEY FREDERICK CORBY.
RICHARD JAMES PLEACE.